United States Patent
Kato et al.

(10) Patent No.: US 6,186,398 B1
(45) Date of Patent: Feb. 13, 2001

(54) MAGNETIC CARD

(75) Inventors: Yoko Kato; Keisuke Hori, both of Tokyo-To (JP)

(73) Assignee: Dai Nippon Printing Co., Ltd., Tokyo (JP)

( * ) Notice: Under 35 U.S.C. 154(b), the term of this patent shall be extended for 0 days.

(21) Appl. No.: 08/972,458

(22) Filed: Nov. 14, 1997

(30) Foreign Application Priority Data

Nov. 18, 1996 (JP) .................................................. 8-306052
Oct. 27, 1997 (JP) .................................................. 9-294443

(51) Int. Cl.$^7$ ...................................................... G06K 7/08
(52) U.S. Cl. ........................ 235/449; 235/493; 428/65.3; 428/611
(58) Field of Search ................................... 235/449, 453, 235/457, 487, 493; 428/611, 694 TP, 65.3, 65.5, 64.1

(56) References Cited

U.S. PATENT DOCUMENTS

| | | | |
|---|---|---|---|
| 4,410,583 | * 10/1983 | Hanaoka | 428/213 |
| 4,631,222 | 12/1986 | Sander | 428/172 |
| 4,684,795 | 8/1987 | Colgate, Jr. | 235/457 |
| 4,696,845 | * 9/1987 | Yanagisawa | 428/64 |
| 4,856,857 | 8/1989 | Takeuchi et al. | 350/3.6 |
| 5,184,149 | * 2/1993 | Tamaka et al. | 346/74.2 |
| 5,236,791 | * 8/1993 | Yahisa et al. | 428/694 |
| 5,496,633 | * 3/1996 | Steuerwald et al. | 235/493 |
| 5,720,500 | * 2/1998 | Okazaki et al. | 235/449 |

FOREIGN PATENT DOCUMENTS

| | | | | |
|---|---|---|---|---|
| 0310707 | * 12/1989 | (EP) | | B42D/15/02 |
| 2270499 | 3/1994 | (GB) | . | |
| 59-206020 | 1/1984 | (JP) | . | |
| 1-256055 | 9/1989 | (JP) | . | |
| 1-1177416 | 10/1989 | (JP) | . | |
| 2-100847 | 4/1990 | (JP) | . | |
| 03114879 | * 5/1991 | (JP) | | B41M/5/26 |
| WO 95/22454 | 8/1995 | (WO) | . | |

* cited by examiner

Primary Examiner—Karl D. Frech
Assistant Examiner—Daniel St. Cyr
(74) Attorney, Agent, or Firm—Morgan & Finnegan LLP

(57) ABSTRACT

A magnetic card in which a magnetic layer is successfully concealed without lowering the magnetic output of the magnetic layer and giving any restriction to the design of the card. Such a magnetic card can be produced in the following manner. A magnetic layer (magnetic stripe) 12 is formed on a substrate 11 by means of thermal transfer, and a thin film layer 13 is formed, by vacuum deposition or the like, on the entire surface of the substrate 11 including the surface of the magnetic layer 12 to conceal the magnetic layer 12. Patterns, etc. are printed on the surface of the thin film layer 13 to form a print layer 14, and a light-diffractive structure layer 15 is further formed on the print layer 14 of thermal transfer. On the other hand, a print layer 14A is provided on the back surface of the substrate 11, and a reverse side protective layer 16 is further provided on the print layer 14A to cover it. After these layers are formed to obtain a laminate, a card of a predetermined shape is punched from the laminate, and subjected to a post-treatment to finally obtain a magnetic card 10.

7 Claims, 2 Drawing Sheets

MAGNETIC CARD

BACKGROUND OF THE INVENTION

1. Field of the Invention

The present invention relates to a magnetic card comprising a substrate, and a magnetic layer provided thereon, in which information is magnetically recorded in such a manner that the recorded information can be mechanically read.

2. Description of Related Art

A magnetic card is produced by providing, on a substrate, a magnetic layer in which the ID number of the user of the card, and the like are magnetically recorded in such a manner that the recorded data can be mechanically read. Magnetic cards of this type are widely used as bank cards, credit cards, and the like.

It has conventionally been known that the magnetic layer is concealed in order to ensure the security of the magnetic card. Conventional methods for concealing the magnetic layer are as follows:

- a first method in which a specific ink is applied, by means of printing, to the entire surface of the substrate including the surface of the magnetic layer provided on the substrate, thereby concealing the magnetic layer;
- a second method in which an ink is applied, by means of printing, to the surface of the magnetic layer provided on the substrate, wherein the color of the ink is the same as that of the substrate, thereby concealing the magnetic layer; and
- a third method in which an ink is applied, by means of printing, to the surface of the substrate excluding the surface of the magnetic layer provided on the substrate, wherein the color (dark color) of the ink is the same as that of the magnetic layer, thereby concealing the magnetic layer.

However, the conventional magnetic cards have had the following problem. Namely, when the thickness of the ink layer which is provided on the magnetic layer by means of printing is increased, the magnetic output of the magnetic layer is lowered, so that reading errors can be made when the information recorded in the magnetic layer is read. Under the circumstances, it has been impossible to form, on the magnetic layer by means of printing, an ink layer whose thickness is larger than approximately 6 micrometers. Therefore, there has been such a problem that, when an ink is applied to the magnetic layer by means of printing to conceal the magnetic layer by the above-described first or second method, and when patterns, etc. are further printed on the surface of this ink layer, the number of colors which can be used for printing the patterns, etc. is limited.

On the other hand, in the case of the above third method, an ink is not applied to the surface of the magnetic layer by means of printing, so that this method is free from the aforementioned problem. However, the card produced by the third method is entirely darkish in color. The design of the card is therefore restricted.

SUMMARY OF THE INVENTION

The present invention has been accomplished in the light of the foregoing problems. An object of the present invention is therefore to provide a magnetic card in which a magnetic layer is successfully concealed without lowering the magnetic output thereof and restricting the design of the card.

A first aspect of the present invention is a magnetic card comprising a substrate, a magnetic layer provided on the substrate, in which information is magnetically recorded in such a manner that the recorded information can be mechanically read, and a thin film layer made from a metal or metallic compound having the property of concealing the underlying layer, provided to cover at least the magnetic layer. Both the recording of information in the magnetic layer, and the reading of the information recorded in the magnetic layer being performed through the thin film layer provided on the magnetic layer.

A second aspect of the present invention is a magnetic card whose structure is the same as that of the above-described magnetic card except that a first protective layer into which the above magnetic layer is embedded is further provided between the substrate and the thin film layer.

In the present invention, it is preferable that the above-described thin film layer be simply formed by means of vapor deposition, electrodeposition or sputtering. Further, it is preferable that a print layer, and/or a light-diffractive structure layer having a light-diffractive pattern be provided on the surface of the thin film layer. Furthermore, it is preferable that the print layer and the light-diffractive structure layer be provided by allowing them to at least partly overlap each other in the direction of thickness and that such a part of the light-diffractive structure layer that overlaps the print layer in the direction of thickness be made either transparent or semitransparent so that the print layer can be visually seen through the light-diffractive structure layer. In addition, it is preferable that, in the region where the print layer and the light-diffractive structure layer overlap each other in the direction of thickness, these layers be so provided that at least a part of the image reconstructed from the light-diffractive structure layer by the diffraction of light will align with the image formed in the print layer in order to make the magnetic card more aesthetic.

Further, it is preferable to provide a transparent or semi-transparent second protective layer on the surface of the above-described print layer or light-diffractive structure layer in order to protect the print layer or the light-diffractive structure layer. Furthermore, it is preferable to color the light-diffractive structure layer or the second protective layer to a predetermined color in order to make the magnetic card still more aesthetic.

According to the first and second aspects of the present invention, the thin film layer can be made extremely thin as compared with the print layer or the light-diffractive structure layer. This means that the magnetic layer can be concealed by an extremely thin layer. Thus, it becomes possible to produce magnetic cards without undergoing the limitation on the number of colors which can be used for the print layer to be provided on the magnetic layer, while sufficiently retaining the magnetic output of the magnetic layer.

DETAILED DESCRIPTION OF THE INVENTION

First Embodiment

Figure 1:
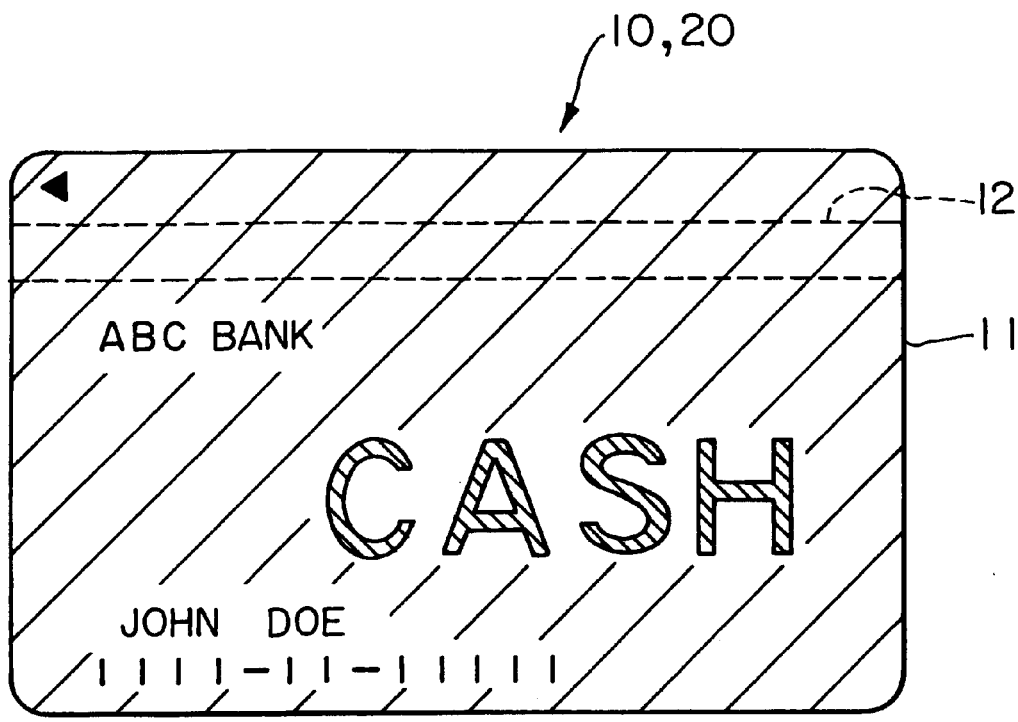
FIG. 1 is a plan view showing the first and second embodiments of a magnetic card according to the present invention.
Figure 2:
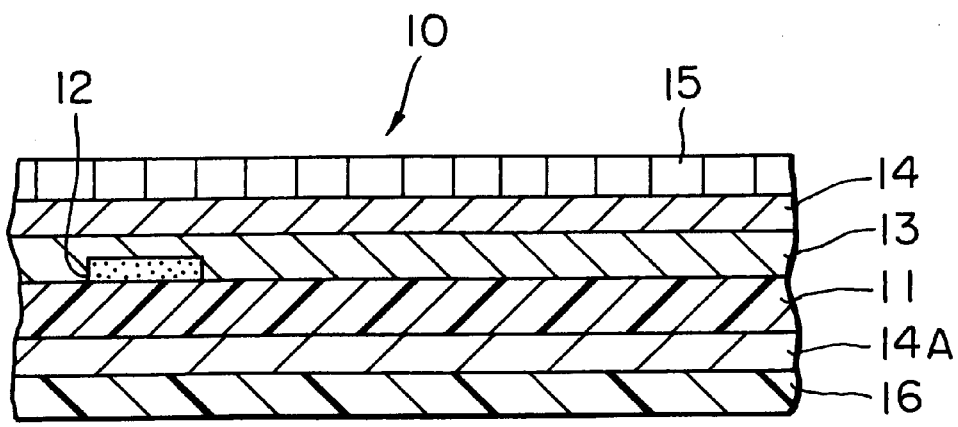
FIG. 2 is a sectional view showing the formation of layers in the first embodiment of a magnetic card according to the present invention.

By referring now to the accompanying drawings, embodiments of the present invention will be explained. FIG. 1 is a plan view showing the first and second embodiments of a magnetic card according to the present invention. FIG. 2 is a sectional view showing the formation of layers in the first embodiment of a magnetic card according to the present invention.

As shown in FIGS. 1 and 2, a magnetic card 10 comprises a substrate 11, and on the surface of this substrate 11 are laminated a magnetic layer 12, a thin film layer 13, a print layer 14 and a light-diffractive structure layer 15 in the mentioned order. Further, on the back surface of the substrate 11, a print layer 14A and a reverse side protective layer 16 are successively laminated.

Substrate

Materials that can be used for making the substrate 11 include vinyl chloride resins, vinyl chloride-vinyl acetate copolymers, polyester resins, and papers. These materials can be used either singly or in combination of two or more. The thickness of the substrate 11 is approximately 0.1 mm to 2.0 mm. If it is desired to make the magnetic card 10 conformable to the ISO standard, the thickness of the substrate 11 is selected so that the total thickness of the magnetic card 10 will be approximately 0.76 mm.

Magnetic Layer

On the surface of the substrate 11, a strip of the magnetic layer 12 is provided. The magnetic layer 12 is made from a magnetic material. In this layer, data such as the ID number of the user of the magnetic card 10 are magnetically recorded in such a manner that the recorded data can be mechanically read.

Thin Film Layer

The thin film layer 13 is provided on the entire surface of the substrate 11 including the surface of the magnetic layer 12 provided on the substrate 11. The thin film layer 13 is for concealing the magnetic layer 12. It is an extremely thin film of an opaque metal or metallic compound having the property of concealing the underlying layer.

To form the thin film layer 13, metals such as Al, Cr, Fe, Co, Ni, Cu, Ag, Au, Ge, Mg, Sb, Pb, Cd, Bi, Sn, Se, In, Ga and Rb, and compounds of these metals (metallic oxides, metallic nitrides, etc.) can be used either singly or in combination of two or more. Of these metals, Al, Cr, Ni, Ag and Au are particularly preferred.

Vapor deposition, electrodeposition, sputtering or the like can be mentioned as a method for forming the thin film layer 13. "Vapor deposition" is a method for adhering a film of a metal or metallic compound to the surface of an adherend; more specifically, a method in which a metal or metallic compound that is dissolved and evaporated in vacua by directly applying thereto an electric current is deposited to the surface of an adherend placed in the vacuum system. Vapor deposition includes aluminum vapor deposition and gold vapor deposition. "Electrodeposition" is a method in which a metal or metallic compound is allowed to separate out on an electrode by means of electrolysis. Electrodeposition includes electroplating. "Sputtering" is a method in which glow discharge is caused in argon gas under reduced pressure to impinge ionized gas atoms upon a target, and those target-constituting atoms which are driven out from the target by the impingement are deposited on the surface of an adherend.

The thickness of the thin film layer 13 is approximately 200 to 1,000 angstroms, preferably about 500 angstroms. The thin film layer 13 is opaque, so that the magnetic layer 12 is concealed when the thin film layer 13 is provided thereon.

Print Layer

The print layer 14 is provided on the almost entire surface of the thin film layer 13 which has been provided on the surface of the substrate 11. The print layer 14 is for indicating letters, figures, or symbols, or a combination thereof. In FIG. 1, the designation of a bank, and the logotype "CASH" that shows the use of the magnetic card 10 are printed. When the print layer 14 is formed by printing letters or the like, the above-described thin film layer 13, which is positioned under the print layer 14, can be seen through the print layer 14. It is also possible to provide a first print layer to cover the underlying thin film layer 13, and to further provide thereon a second print layer by printing letters or the like.

The print layer 14 is formed by means of silk screen printing or the like. The thickness of the print layer 14 is approximately 1 micrometer.

Light-Diffractive Structure Layer

The light-diffractive structure layer 15 is provided on the almost entire surface of the substrate 11 including the surface of the print layer 14. The light-diffractive structure layer 15 has a light-diffractive pattern such as a surface relief pattern, or a pattern of the distribution of refractive index difference, from which a two- or three-dimensional image can be reconstructed by the diffraction of light. The image reconstructed from the light-diffractive structure layer 15 by the diffraction of light is expressed by letters, figures, symbols, or a combination thereof, or a combination of these ones and colors. It is preferable that the light-diffractive structure layer 15 and the print layer 14 be so provided that at least a part of the image reconstructed from the light-diffractive structure layer 15 by the diffraction of light can align with at least a part of the letters or the like shown by the print layer 14. Specifically, it is preferable to form the print layer 14 by printing the same letters, figures, etc. as those in the image to be reconstructed by the diffraction of light so that these two images can be seen as a single image or that the figures (flat ones) formed in the print layer 14 which are the same as those in the image reconstructed by the diffraction of light can be seen even from an angle which is outside the range of image reconstruction angles.

The surface relief pattern for the light-diffractive structure layer 15 includes relief holograms, relief diffraction gratings, etc., in which the distribution of the intensities of the light of interference fringes formed by the interference between object wave and reference wave is recorded as a relief pattern. Specifically, there can be mentioned holograms from which an image is reconstructed by using white light, such as rainbow hologram; color hologram, computer hologram and holographic stereogram which utilize the principle of the above holograms; and holographic diffraction grating which is formed by utilizing a holographic recording means. Besides these holograms and diffraction gratings, there can also be mentioned such a hologram or diffraction grating that any diffracted light can be obtained by calculation by using a diffraction grating which is mechanically made by an electron beam imaging apparatus. It is noted that one of or a plurality of these holograms or diffraction gratings may also be recorded in the light-diffractive structure layer 15.

Further, the pattern of the distribution of refractive index difference for the light-diffractive structure layer 15 includes Lippmann hologram or Denisyuk hologram.

Figure 3:
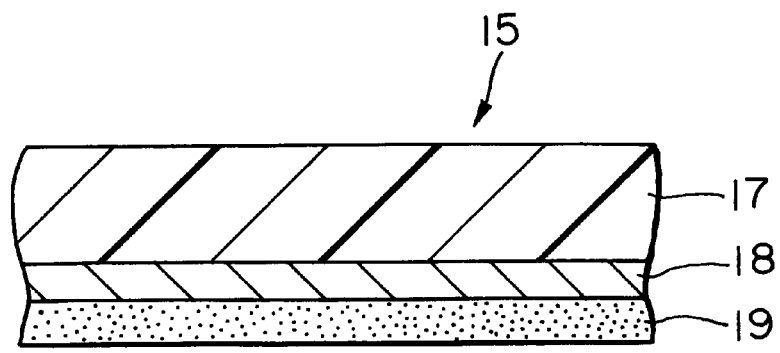
FIG. 3 is a sectional view showing the formation of layers in the light-diffractive structure layer shown in FIG. 2.

FIG. 3 is a sectional view showing the formation of layers in the light-diffractive structure layer 15. As shown in FIG. 3, the light-diffractive structure layer 15 is composed of a resin layer 17 serving as a substrate layer, a reflecting layer 18 provided on the back surface of the resin layer 17, and an adhesive agent layer 19 provided to cover the outer surface of the reflecting layer 18.

Resin Layer of Light-Diffractive Structure Layer

As a material for forming the resin layer 17 of the light-diffractive structure layer 15, it is possible to use such a synthetic resin that fine irregularities can be provided on the surface thereof to form the above-described surface relief pattern.

Examples of such a synthetic resin include thermoplastic synthetic resins such as polyvinyl chloride, acrylic resins (e.g., polymethylmethacrylate, etc.), polycarbonate and polystyrene, and thermosetting synthetic resins such as unsaturated polyesters, melamine resins and epoxy resins. Mixtures of these thermoplastic synthetic resins and thermosetting synthetic resins may also be used.

It is preferable to use such synthetic resins that fine irregularities can be provided on the surfaces thereof to form the surface relief pattern and that, after the formation of the fine relief pattern, the resins are cured to show sufficiently high durability. Ultraviolet-curing resins, electron-beam-curing resins, and reactive resins of thermosetting type or of hardening type can also be used.

Information recorded in the magnetic layer 12 of the magnetic card 10 is read by a magnetic head by sliding it on the surface of the light-diffractive structure layer 15. In order to prevent the light-diffractive structure layer 15 from being worn out, it is preferable to form the resin layer 17 of the light-diffractive structure layer 15 by using a resin having wear-resistant properties such as an ultraviolet-curing acrylic resin.

The resin layer 17 is formed either by a conventional coating method such as gravure, die, knife or roll coating method, or by an ordinary printing method such as offset, silk screen or type printing method so that the thickness will be from 0.1 to several micrometers.

Reflecting Layer of Light-Diffractive Structure Layer

The reflecting layer 18 which is provided on the underside surface of the resin layer 17 of the light-diffractive structure layer 15 is for imparting reflecting properties to the image-diffractive pattern. It is required that the print layer 14 on which the light-diffractive structure layer 15 is provided can be seen through the reflecting layer 18 of the light-diffractive structure layer 15. Therefore, a material having both reflecting properties and transparency is used for forming the reflecting layer 18.

Examples of materials useful for forming the reflecting layer 18 include metallic thin film, or continuous thin film made from substances whose refractive indexes are different from that of the resin layer 17. The continuous thin film may have any thickness as long as it is transparent. In general, however, the thickness of the continuous thin film is preferably in the range of 100 to 1,000 angstroms. Such a continuous thin film is formed on the underside surface of the resin layer 17 by a conventional method for forming a thin film such as vacuum deposition, sputtering or ion plating.

The refractive index of the continuous thin film which is used as the reflecting layer 18 can be either higher or lower than that of the resin layer 17. It is however preferable that the difference between the refractive indexes of these two layers be preferably 0.3 or more, more preferably 0.5 or more, most preferably 1.0 or more. Examples of continuous thin films whose refractive indexes are higher than that of the resin layer 17 include thin films of ZnS, $TiO_2$ and $Al_2O_3$. Examples of continuous thin films whose refractive indexes are lower than that of the resin layer 17 include thin films of LiF, $MgF_2$ and $AlF_3$.

The metallic thin film useful as the reflecting layer 18 includes a film made from a single metal of Al, Te or the like. Such a metallic thin film slightly shows light-transmitting properties when the thickness thereof is as thin as 200 angstroms or less, so that it can be used as the reflecting layer 18 having transparency.

A transparent layer made from such a synthetic resin as polytetrafluoroethylene, polychlorotrifluoroethylene, polyvinyl acetate, polyethylene, polypropylene or polymethylmethacrylate, having a refractive index different from that of the resin layer 17 can also be used as the reflecting layer 18.

Adhesive Agent Layer of Light-Diffractive Structure Layer

The adhesive agent layer 19 which is provided to cover the outer surface of the reflecting layer 18 of the light-diffractive structure layer 15 is for adhering the light-diffractive structure layer 15 to the print layer 14. Various types of adhesive agents can be used for forming the adhesive agent layer 19. For example, it is possible to use an adhesive agent comprising as its main component(s) one or more materials selected from thermosetting resins including phenolic resins, thermoplastic resins including polyvinyl acetate resins, rubbers including butadiene-acrylonitrile rubber, and other materials such as glues, natural resins, caseins, sodium silicate, dextrins, starches and gum arabic.

These adhesive agents may be of any type such as a solution, emulsion, powder or film type. Moreover, they may also be of any type such as a cold-setting type, solvent type or hot-melt type.

Further, it is also possible to use heat sensitive adhesive agents (heat sealing agents) which reveal adhesiveness when heated. Examples of materials which can be used for producing heat sensitive adhesive agents include thermoplastic resins such as polyethylene, polyvinyl acetate, polyethylene-polyvinyl acetate copolymers and acrylic resins, and thermosetting resins such as epoxy resins and phenolic resins, which are unhardened.

The adhesive agent layer 19 is formed by applying such an adhesive agent to the surface of the reflecting layer 18 by means of silk screen printing so that the thickness will be approximately 2 to 3 micrometers.

If the light-diffractive structure layer 15 includes Lippmann hologram or Denisyuk hologram having the pattern of the distribution of refractive index difference, the reflecting layer 18 provided on the surface of the resin layer 17 made from photopolymers or dichromate gelatin having the distribution of refractive index difference may be omitted, and the adhesive agent layer 19 may be provided directly on the resin layer 17.

The light-diffractive structure layer 15 composed of the aforementioned layers is formed so that the total thickness of the layer 15 will be approximately 5 micrometers or less. This is because, when the total thickness of the layers provided on the magnetic layer 12 is approximately 6 micrometers or less, sufficiently high magnetic field intensity can generally be secured on the light-diffractive structure layer 15 although it depends on the intensity of the magnetic field formed by the magnetic layer 12, and the data recorded in the magnetic layer 12 can be read accurately.

Next, a method for producing a magnetic card 10 having the aforementioned structure will now be explained.

A magnetic layer (magnetic stripe) 12 is firstly formed on a substrate 11 by means of thermal transfer. A thin film layer 13 is then formed on the entire surface of the substrate 11 including the surface of the magnetic layer 12 by means of vapor deposition or the like, thereby concealing the magnetic layer 12. Thereafter, patterns, etc. are printed on the surface of the thin film layer 13 to form a print layer 14. A light-diffractive structure layer 15 is further formed on the surface of the print layer 14 by means of thermal transfer.

On the other hand, on the back surface of the substrate 11, a print layer 14A is provided. The print layer 14A is then covered with a reverse side protective layer 16. The reverse side protective layer 16 is for protecting the print layer 14A, and formed by using, for example, a transparent or semitransparent resin such as a vinyl chloride resin.

After all of the layers are thus formed to make a laminate, a card of a predetermined shape is punched from the laminate, and then subjected to a post-treatment to finally obtain a magnetic card 10.

Thus, according to the first embodiment of the present invention, the magnetic layer 12 is concealed by the thin film layer 13. This means that the magnetic layer 12 can be concealed by an extremely thin layer unlike the conventional magnetic cards in which the magnetic layer 12 is concealed by an ink layer formed thereon by means of printing. Thus, it becomes possible to produce magnetic cards without undergoing the limitation on the number of colors which can be used for the print layer 14 to be provided on the magnetic layer 12, while sufficiently retaining the magnetic output of the magnetic layer 12.

Further, through the light-diffractive structure layer 15, the underlying layer can be seen. Therefore, letters, figures, or the like expressed by the print layer 14 can be visually seen through the light-diffractive structure layer 15. Furthermore, by aligning the image which is reconstructed from the light-diffractive structure layer 15 by the diffraction of light and the image in the print layer 14 with each other, it is possible to make the magnetic card more aesthetic. It is also possible to color the light-diffractive structure layer 15 to a predetermined color (e.g., a metallic color, etc.). By doing so, the magnetic card becomes still more aesthetic.

In addition, since the light-diffractive structure layer 15 is formed on the almost entire surface of the substrate 11, the positioning between the light-diffractive structure layer 15 and the substrate 11 becomes difficult. It is thus possible to prevent the forgery of the magnetic card, which is committed, for example, by separating the light-diffracting structure layer 15 from the magnetic card, and by applying it to other magnetic card.

Further, even when the print layer 14 and the light-diffractive structure layer 15 are provided by allowing them to overlap each other in the direction of thickness, both the image reconstructed from the light-diffractive structure layer 15 by the diffraction of light and the image in the print layer 14 can be visually seen. It is therefore possible to freely form images on the substrate 11 without any restriction. Furthermore, the print layer 14 or the light-diffractive structure layer 15 can be provided on the almost entire surface of the substrate 11 without being restricted by the magnetic layer 12. This is also favorable from the viewpoint of design.

Second Embodiment

Figure 4:
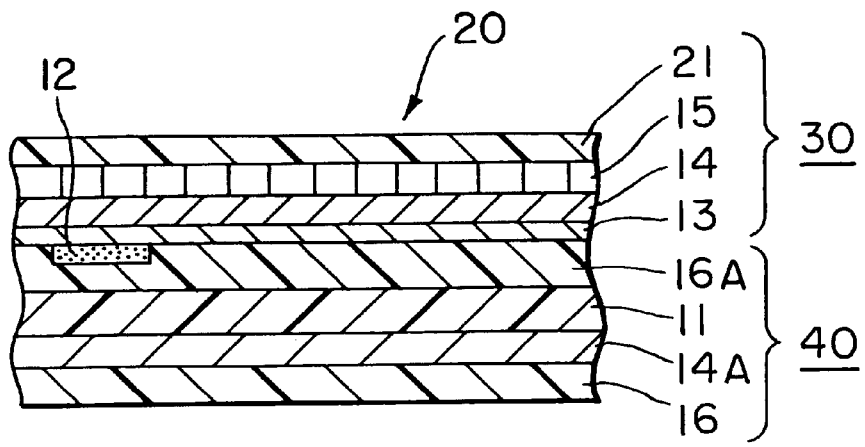
FIG. 4 is a sectional view showing the formation of layers in the second embodiment of a magnetic card according to the present invention.
Figure 5:
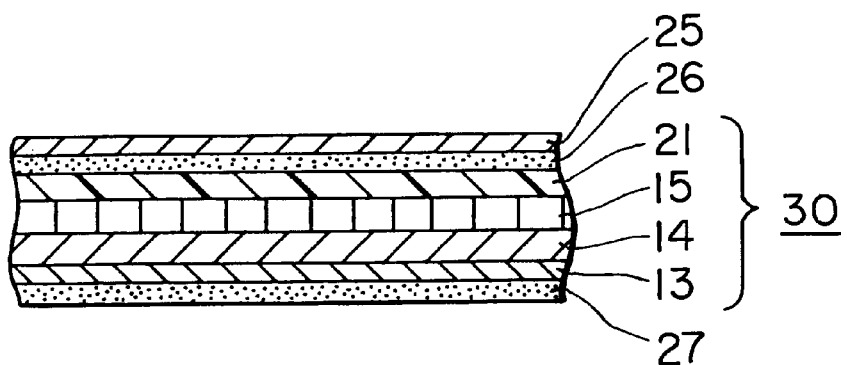
FIG. 5 is a sectional view showing a thermal transfer printing sheet comprising the first laminated structure shown in FIG. 4.

By referring to FIGS. 1, 4 and 5, the second embodiment of the present invention will now be explained. FIG. 4 is a sectional view showing the formation of layers in the second embodiment of a magnetic card according to the present invention; and FIG. 5 is a sectional view showing a thermal transfer sheet which comprises the first laminated structure shown in FIG. 4. The second embodiment of the present invention is almost the same as the first embodiment of the present invention as shown in FIGS. 1 to 3, except that an inner protective layer (first protective layer) into which the magnetic layer is embedded is provided between the substrate and the thin film layer and that a transparent protective layer (second protective layer) is provided on the light-diffractive structure layer. In the second embodiment of the present invention, the same parts as those in the first embodiments shown in FIGS. 1 to 3 are indicated by like reference numerals, and detailed explanations for these parts will not be given any more.

As shown in FIGS. 1 and 4, a magnetic card 20 comprises a substrate 11, and on the surface of this substrate 11 are laminated an inner protective layer 16A, a magnetic layer 12, a thin film layer 13, a print layer 14, a light-diffractive structure layer 15 and a transparent protective layer 21 in the mentioned order. On the other hand, a print layer 14A and a reverse side protective layer 16 are successively provided on the back surface of the substrate 11. The transparent protective layer 21, the light-diffractive structure layer 15, the print layer 14 and the thin film layer 13 constitute a first laminated structure 30 in the magnetic card 20, whereas the magnetic layer 12, the inner protective layer 16A, the substrate 11, the print layer 14A and the reverse side protective layer 16 constitute a second laminated structure 40 in the magnetic card 20.

Inner Protective Layer (First Protective Layer)

As shown in FIG. 4, the inner protective layer 16A is provided between the substrate 11 and the thin film layer 13. The inner protective layer 16A contains therein the magnetic layer 12 which is embedded so that the surface of the magnetic layer 12 will be level with that of the inner protective layer 16A. The inner protective layer 16A is formed by using the same material as that for forming the reverse side protective layer 16, for instance, a transparent or semitransparent resin such as a vinyl chloride resin.

Transparent Protective Layer (Second Protective Layer)

The transparent protective layer 21 is provided on the light-diffractive structure layer 15 for the protection thereof. It is preferable to use, as a material for the transparent protective layer 21, a mixture of the material useful for the inner protective layer 16A and reverse side protective layer 16, for instance, a transparent or semitransparent resin such as a vinyl chloride resin, and an ultraviolet- or electron beam-curing resin. Further, it is also preferable to color the transparent protective layer 21 to a predetermined color (e.g., a metallic color, etc.). By doing so, it is possible to make the magnetic card more aesthetic.

In terms of constitution (material, thickness, etc.), the substrate 11, the magnetic layer 12, the thin film layer 13, the print layer 14, the light-diffractive structure layer 15, the print layer 14A, and the reverse side protective layer 16 are almost the same as those in the aforementioned first embodiment as shown in FIGS. 1 to 3 except that the light-diffractive structure layer 15 is composed of a resin layer and a reflecting layer only and does not contain an adhesive agent layer.

Next, a method for producing a magnetic card 20 having the above-described structure will now be explained.

A thermal transfer sheet comprising the first laminated structure 30, and the second laminated structure 40 which is useful for conventional cards are separately prepared.

As shown in FIG. 5, a thermal transfer sheet comprising the first laminated structure 30 is prepared by successively laminating, on a substrate 25 for a release sheet, a release layer 26, a transparent protective layer 21, a light-diffractive structure layer 15, a print layer 14, a thin film layer 13 and an adhesive agent layer 27.

The second laminated structure 40 is prepared in the following manner. An inner protective layer 16A is provided on the surface of a substrate 11. A print layer 14A is provided on the back surface of the substrate 11, and a reverse side protective layer 16 is formed on the print layer 14A to cover it. A magnetic layer (magnetic stripe) 12 is formed, by means of thermal transfer, on the surface of the inner protective layer 16A, which has been provided on the surface of the substrate 11. The thus-obtained laminate consisting of the magnetic layer 12, the inner protective layer 16A, the substrate 11, the print layer 14A and the reverse side protective layer 16 is hot-pressed, whereby the layers are adhered to each other by the autohesion of the inner protective layer 16A and that of the reverse side protective layer 16. By this hot pressing, the magnetic layer 12 is embedded into the inner protective layer 16A, and the surface of the magnetic layer 12 becomes level with that of the inner protective layer 16A.

The thermal transfer sheet comprising the first laminated structure 30 is superposed on the second laminated structure 40 so that the adhesive agent layer 27 of the thermal transfer sheet and the inner protective layer 16A of the second laminated structure 40 can face each other. These two are integrated by means of hot pressing. A card of a predetermined shape is punched from this integrated material, and then subjected to a post-treatment to finally obtain a magnetic card 20.

Thus, according to the second embodiment of the present invention, the strength and design of the magnetic card 20 can be improved by providing the transparent protective layer 21 while obtaining actions and effects which are comparable to those obtainable from the previously-mentioned first embodiment; and it also becomes possible to produce magnetic cards more easily and accurately.

Although some embodiments of the invention have been disclosed and described, it is apparent that the present invention is not limited to the foregoing first and second embodiments and that various modifications which come within the spirit and the scope of the present invention are possible. For instance, although the thin film layer 13 is provided on the almost entire surface of the substrate 11 in the aforementioned first and second embodiments, it can also be provided only on the surface of the magnetic layer 12 to cover it. Further, the print layer 14 and the light-diffractive structure layer 15 are provided as needed, and can be formed on any region on the surface of the substrate 11. Furthermore, a coloring layer may also be provided in addition to the print layer 14 or to the light-diffractive structure layer 15. Moreover, it is also possible to impart the function of IC card, optical card, or the like by providing an IC module, an optical recording section, or the like to the back surface of the substrate 11.

EXAMPLES

Specific examples of the aforementioned first and second embodiments will be described below.

Example 1

One example of the magnetic card 10 as shown in FIGS. 1 to 3, which is the first embodiment of the present invention, will be shown below.

On a substrate 11 made from a white-colored vinyl chloride resin, having a thickness of 0.56 mm, a magnetic layer (magnetic stripe) 12 having a thickness of 20 micrometers, capable of forming a magnetic field with an intensity of 600 Oe was formed by means of thermal transfer. A thin film layer 13 (the thickness of the thin film layer 13 on the magnetic layer 12: 500 angstroms) was formed on the entire surface of the substrate 11 including the surface of the magnetic layer 12 by depositing aluminum by means of vacuum deposition, thereby concealing the magnetic layer 12.

Thereafter, patterns, etc. were printed on the surface of the thin film layer 13 by means of silk screen printing to form a print layer 14 having a thickness of 1 micrometer. A light-diffractive structure layer 15 was further formed on the print layer 14 by means of thermal transfer.

Preparation of Light-Diffractive Structure Layer

The light-diffractive structure layer 15 was made in the following manner. A hologram original plate was placed on an ultraviolet-curable acrylic resin layer having a thickness of 2 micrometers. This one was hot-pressed for 1 minute under the conditions of 150° C. and 50 kg/cm$^2$, thereby stamping the hologram relief on the surface of the resin layer. The hologram original plate was then separated. Ultraviolet light was then applied to the resin layer to cure the layer. A resin layer 17 with the hologram relief was thus formed.

On this hologram-relief-formed surface of the resin layer 17, a thin film of titanium oxide having a thickness of 200 angstroms was formed by means of vacuum deposition, thereby providing a reflecting layer 18.

Onto the surface of this reflecting layer 18, an adhesive-agent-layer-forming coating liquid having the following composition was coated by means of gravure reverse coating so that the thickness of the resulting layer after dried would be 2 micrometers, and then dried, thereby forming an adhesive agent layer 19.

| Composition of Coating Liquid for Forming Adhesive Agent Layer: | |
|---|---|
| (1) Vinyl chloride-vinyl acetate copolymer | 20 parts by weight |
| (2) Acrylic resin | 10 parts by weight |
| (3) Solvent: ethyl acetate | 20 parts by weight |
| (4) Solvent: toluene | 50 parts by weight |

Production of Magnetic Card

The thus-prepared light-diffractive structure layer 15 consisting of the resin layer 17, the reflecting layer 18 and the adhesive agent layer 19 was adhered to the surface of the print layer 14.

On the other hand, patterns, instructions for use, etc. were printed on the back surface of the substrate 11 by means of silk screen printing, thereby forming a print layer 14 A having a thickness of 1 micrometer. This print layer 14 A was then covered with a reverse side protective layer 16 made from a transparent vinyl chloride resin, having a thickness of 0.1 mm.

After all of the layers were thus formed, the resulting laminate was hot-pressed by a hot stamping press for 1 minute under the conditions of 150° C. band 10 kg/cm$^2$. A card of a predetermined shape was punched from the hot-pressed laminate, and then subjected to a post-treatment to finally obtain a magnetic card 10.

In the magnetic card 10 of Example 1, produced in the above-described manner, the magnetic layer 12 was able to be successfully concealed by the thin film layer 13 having a thickness of as extremely small as 500 angstroms, and the total thickness of the layers provided on the magnetic layer 12 became approximately 5 micrometers. Thus, it became possible to produce magnetic cards without undergoing the limitation on the number of colors which can be used for the print layer 14 to be provided on the magnetic layer 12, while retaining the magnetic output of the magnetic layer 12.

Example 2

Next, one example of the magnetic card 20 as shown in FIGS. 1, 4 and 5, which is the second embodiment of the present invention, will be shown below.

Preparation of Thermal Transfer Sheet Comprising First Laminated Structure

A release sheet shown in FIG. 5 was prepared in the following manner: a biaxially oriented transparent PET film having a thickness of 25 micrometers was used as the substrate 25 of the release sheet; one surface of this substrate was subjected to a corona discharge treatment; and a release-layer-forming coating liquid having the following composition was coated onto this corona-discharged surface by means of gravure reverse coating so that the thickness of the resulting layer after dried would be 0.5 micrometers, thereby forming a release layer 26 to obtain the desired release sheet.

| Composition of Coating Liquid for Forming Release Layer: | |
|---|---|
| (1) Melamine resin | 5 parts by weight |
| (2) Solvent: methyl alcohol | 25 parts by weight |
| (3) Solvent: ethyl alcohol | 45 parts by weight |
| (4) Cellulose acetate resin | 1 part by weight |
| (5) para-Toluenesulfonic acid | 0.05 parts by weight |

Onto the surface (in FIG. 5, the underside) of the release layer 26 of the release sheet, a transparent-protective-layer-forming coating liquid having the following composition was coated by means of gravure reverse coating so that the thickness of the resulting layer after dried would be 0.5 micrometers. Ultraviolet light was then applied to the coated layer by an ultraviolet-light irradiator (twin high-pressure mercury vapor lamp, power output=160 W/cm) in an irradiation dose of 500 mJ/cm$^2$ to cure the layer. Thus, a transparent protective layer 21 was formed.

| Composition of Coating Liquid for Forming Transparent Protective Layer: | |
|---|---|
| (1) Polyurethane acrylate (prepolymer) | 20 parts by weight |
| (2) Dipentaerythritol hexaacrylate | 100 parts by weight |
| (3) 2-Hydroxyethylacrylate | 5 parts by weight |
| (4) Photopolymerization initiator | 1 part by weight |
| (5) Sensitizer | 1 part by weight |

Onto the surface (in FIG. 5, the underside) of the transparent protective layer 21, a resin-layer-forming coating liquid having the following composition was coated by means of gravure reverse coating so that the thickness of the resulting layer after dried would be 2 micrometers, and then dried at 100° C. for 1 minute, thereby forming a resin layer, a constituent of a light-diffractive structure layer 15.

| Composition of Coating Liquid for Forming Resin Layer of Light-Diffractive Structure Layer: | |
|---|---|
| (1) Acrylic resin | 40 parts by weight |
| (2) Melamine resin | 10 parts by weight |

-continued

| Composition of Coating Liquid for Forming Resin Layer of Light-Diffractive Structure Layer: | |
|---|---|
| (3) Solvent: cyclohexanone | 50 parts by weight |
| (4) Solvent: methyl ethyl ketone | 25 parts by weight |

On the surface of this resin layer of the light-diffractive structure layer, a hologram original plate was placed. This one was hot-pressed for 1 minute under the conditions of 150° C. and 50 kg/cm$^2$, thereby stamping the hologram relief to the resin layer. The hologram original plate was then separated. Ultraviolet light was then applied to the resin layer to cure the layer. A resin layer with the hologram relief was thus formed.

On this hologram-relief-formed surface of the resin layer of the light-diffractive structure layer 15, a thin film of titanium oxide having a thickness of 200 angstroms was formed by means of vacuum deposition, thereby forming a reflecting layer.

Patterns, etc. were then printed on the surface of this reflecting layer of the light-diffractive structure layer 15 by means of silk screen printing, thereby forming a print layer 14 having a thickness of 1 micrometer. Aluminum was further deposited on the surface of this print layer 14 by vacuum deposition to form a thin film layer 13 having a thickness of 500 angstroms.

Onto the surface (in FIG. 5, the underside) of this thin film layer 13, an adhesive-agent-layer-forming coating liquid having the following composition was coated by means of gravure reverse coating so that the thickness of the resulting layer after dried would be 2 micrometers, and the dried. An adhesive agent layer 27 was thus formed.

| Composition of Coating Liquid for Forming Adhesive Agent Layer: | |
|---|---|
| (1) Vinyl chloride-vinyl acetate copolymer | 20 parts by weight |
| (2) Acrylic resin | 10 parts by weight |
| (3) Solvent: ethyl acetate | 20 parts by weight |
| (4) Solvent: toluene | 50 parts by weight |

Preparation of Second Laminated Structure

On the other hand, a second laminated structure 40 was prepared in the following manner. Namely, on the surface of a substrate 11 made from a white-colored vinyl chloride resin, having a thickness of 0.56 micrometers, an inner protective layer 16A made from a transparent vinyl chloride resin, having a thickness of 0.1 mm was provided. On top of this inner protective layer 16A, a magnetic layer (magnetic stripe) 12 having a thickness of 20 micrometers, capable of producing a magnetic field with an intensity of 600 Oe was formed by means of thermal transfer.

On the back surface of the substrate 11, patterns, instructions for use, etc. were printed by means of silk screen printing, thereby forming a print layer 14A having a thickness of 1 micrometer. This print layer 14A was covered with a reverse side protective layer 16 made from a transparent vinyl chloride resin, having a thickness of 0.1 mm. After all of these layers were formed, the resulting laminate was hot-pressed by a hot stamping press for 1 minute under the conditions of 150° C. and 10 kg/cm$^2$. The layers were thus adhered to each other by the autohesion of the inner protective layer 16A and that of the reverse side protective layer 16. By this hot pressing, the magnetic layer 12 was embedded into the inner protective layer 16A, and the surface of the magnetic layer 12 became level with that of the inner protective layer 16A.

Production of Magnetic Card

The thermal transfer sheet comprising the first laminated structure 30 was superposed on the second laminated structure 40 so that the adhesive agent layer 27 of the thermal transfer sheet and the inner protective layer 16A of the second laminated structure 40 would face each other. These two were integrated by hot pressing conducted by a hot stamping press for 1 minute under the conditions of 150° C. and 10 kg/cm². A card of a predetermined shape was punched from this hot-pressed laminate, and then subjected to a post-treatment to finally obtain a magnetic card 20.

In the magnetic card 20 of Example 2, produced in the above-described manner, the magnetic layer 12 was able to be successfully concealed by the thin film layer 13 having a thickness of as extremely small as 500 angstroms, and the total thickness of the layers provided on the magnetic layer 12 became approximately 5.5 micrometers. Thus, it became possible to produce magnetic cards without undergoing the limitation on the number of colors which can be used for the print layer 14 to be provided on the magnetic layer 12, while retaining the magnetic output of the magnetic layer 12.

Example 3

The procedure of Example 2 was repeated except that the transparent-protective-layer-forming coating liquid used in Example 2 for forming the transparent protective layer 21 was replaced with a coating liquid having the following composition, thereby obtaining a magnetic card 20.

| Composition of Coating Liquid for Forming Transparent protective Layer: | |
|---|---|
| (1) Polyurethane acrylate (prepolymer) | 100 parts by weight |
| (2) Photopolymerizable monomer (monofunctional) | 5 parts by weight |
| (3) Photopolymerization initiator | 1 part by weight |
| (4) Sensitizer | 1 part by weight |

In the magnetic card 20 of Example 3, produced in the above-described manner, the magnetic layer 12 was able to be successfully concealed by the thin film layer 13 having a thickness of as extremely small as 500 angstroms, and the total thickness of the layers provided on the magnetic layer 12 became approximately 5.5 micrometers. Thus, it became possible to produce magnetic cards without undergoing the limitation on the number of colors which can be used for the print layer 14 to be provided on the magnetic layer 12, while retaining the magnetic output of the magnetic layer 12.

As explained hereinbefore, according to the present invention, it is possible to make the thin film layer extremely thin as compared with the print layer and the light-diffractive structure layer. This means that the magnetic layer can be concealed by an extremely thin layer. It is therefore possible to produce magnetic cards without undergoing the limitation on the number of colors which can be used for forming the print layer to be provided on the surface of the magnetic layer, while sufficiently retaining the magnetic output of the magnetic layer.

What is claimed is:

1. A magnetic card comprising;

a substrate;

a magnetic layer provided on the substrate, in which information is magnetically recorded in such a manner that the recorded information can be magnetically read;

a thin film layer made from a metal or metallic compound having the property of concealing the underlying layer, provided to cover at least the magnetic layer;

a print layer which is provided either partly or entirely over the surface of the substrate to cover at least a part of the thin film layer; and a light-diffractive structure layer having a light-diffractive pattern from which an image can be reconstructed by the diffraction of light, which is provided either partly or entirely over the surface of the substrate to cover at least a part of the print layer, the light diffractive structure layer having an overlapping region that overlaps the print layer in the direction of thickness, the overlapping region of the light-diffractive structure layer being made either transparent or semitransparent;

wherein the reading of the information recorded in the magnetic layer is performed by a magnetic output obtained from the magnetic layer through the thin film layer, the print layer and the light diffractive structure layer.

2. The magnetic card according to claim 1, further comprising, between the substrate and the thin film layer, a first protective layer into which the magnetic layer is embedded.

3. The magnetic card according to claim 1, wherein the thin film layer is formed by means of vapor deposition, electrodeposition or sputtering.

4. The magnetic card according to claim 1, wherein, in the region where the print layer and the light-diffractive structure layer overlap each other in the direction of thickness, these layers are so provided that at least a part of the image reconstructed from the light-diffractive structure layer by the diffraction of light will align with the image in the print layer.

5. The magnetic card according to claim 1, further comprising a second protective layer which is provided either partly or entirely over the substrate to cover at least a part of the light-diffractive structure layer, the second protective layer having an overlapping region that overlaps the light-diffractive structure layer in the direction of thickness, the overlapping region of the light-diffractive structure layer being made either transparent or semitransparent.

6. The magnetic card according to claim 1 or 4, wherein the light-diffractive structure layer is colored to a predetermined color.

7. The magnetic card according to claim 5, wherein the second protective layer is colored to a predetermined color.

* * * * *